Dec. 10, 1968 M. GREEN 3,415,601

MAGNETO-CARRIER PRESSURE MOTIVE FORCE MOTOR

Filed July 14, 1965

INVENTOR
MILTON GREEN

BY FRANK W. BARNES

AGENT 3,415,601
MAGNETO-CARRIER PRESSURE MOTIVE
FORCE MOTOR
Milton Green, Niantic, Conn., assignor to Burroughs Corporation, Detroit, Mich., a corporation of Michigan
Filed July 14, 1965, Ser. No. 471,898
2 Claims. (Cl. 356—225)

This invention relates to a motor and, more specifically, to a motor wherein torque is developed by Corbino effect currents in a disc of semiconductor material disposed in a properly oriented magnetic field upon the application of appropriate forms of energy.

It is well known to utilize a plurality of photo cells to convert light energy to electrical energy and use this electrical energy in a motor to cause mechanical motion. Devices employing this principle require at least two coils and a set of photo cells for each coil. Coils are wound with opposite polarity, and in order to commutate the light energy they employ alternately the shielding ability of the insensitive side of individual photo cells and the physical interposition of a companion photo cell in the path of light energy.

It is also well known to apply heat to soft magnetic materials, such as iron cobalt or nickel cobalt, in the presence of a magnetic field to cause rotation. In this case, however, the magnetic material goes through a Curie point, that is, it must lose its magnetic characteristic whenever it is heated to the Curie point. In devices of this type most of the energy is wasted in heating and cooling the material, with not much of the heat being converted into kinetic energy for useful work. In addition, devices of this type must have heat in order to work and are incapable of utilizing light directly as a source of energy.

There is a present need for a simple and relatively inexpensive device which is capable of directly converting heat or light energy into mechanical motion.

It will be appreciated that a device capable of direct conversion of these energies into mechanical motion will have many practical applications. For example, space satellites today utilize solar cells as a source of electrical energy. Although these devices have been extremely useful, the efficiency obtainable in their utilization has been between 10 and 15 percent. It will also be appreciated that there are many other applications, such as in a mechanism having heat discharge which could be utilized with the present invention to generate useful energy.

It is, therefore, an object of this invention to provide a simple, relatively inexpensive, semiconductor motor which is capable of directly converting heat or light energy into mechanical motion.

It is an additional object of this invention to improve the efficiency of known energy converters.

It is a further object of this invention to simplify apparatus for directly converting heat or light energy into mechanical motion.

In carrying out the above objectives, applicant's invention comprises a semiconductor rotor disposed in a magnetic field oriented parallel to the axis of rotation of the rotor. Application of heat or light energy to a portion of the rotor causes a flow of both electrons and holes away from the point of highest concentration of the applied energy. The movement of the circulating current components add vectorially to exert a viscous drag on the rotor, thereby causing rotation, that is, the Lorenz force $\pm e\ (V \times B)$ acting on both electrons and holes flowing radially exerts a torque on the rotor. V is equal to the radial velocity of an electron or hole, $\pm e$ is the electric charge on the hole or electron, and B the value of magnetic induction.

Further objects and advantages will become apparent or will be specifically pointed out in the following specification, when taken with the accompany drawings in which.

The concept of the conduction of electricity through matter is generally associated with the transport of material charge carriers, such as electrons and positive and negative ions, through solid, liquid, or gaseous environments; that is, through a conducting medium. When two or more carriers are present in a conductor, the net current density at any point is the sum of the current densities of each of the constituent carriers. If only two types of carriers of opposite polarity are present, the magnitude of the current density is greatest when the carriers are flowing in opposite directions, and least when they are flowing in the same direction. The first situation—flow in opposite direction—tends to occur when the oppositely charged entities are acted upon by electric fields, or when their concentration gradients are in opposite directions. The second situation—flow in the same direction—occurs when the concentration gradients of the two carriers are in the same direction, or when the conducting medium is in motion.

Figure 1:
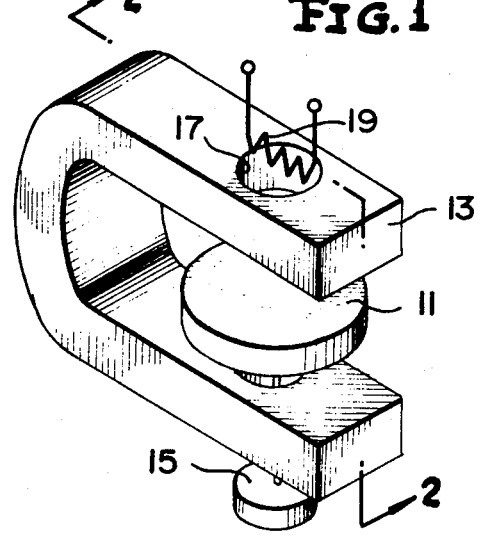
FIG. 1 is an isometric view of applicant's invention utilizing either heat or light as a source of rotational energy.
Figure 2:
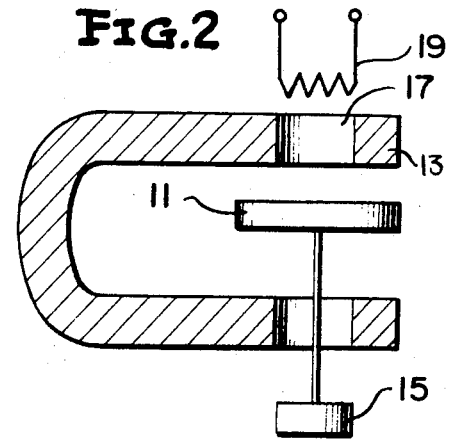
FIG. 2 is a cut-away section of FIG. 1 taken at line 22.

As shown in FIG. 1, a semiconductive disc 11 is rotatably suspended by support means 15 between opposite poles of a source of a magnetic field 13. The source 13 is illustrated for clarity as a horseshoe magnet. An aperture 17 is provided in the magnet 13 so that heat or light energy from the energy source 19 may impinge upon a portion of the semiconductive disc 11.

If light is shined on or heat energy is applied to a particular portion, for example, the central top portion of the disc 11, a "hill" in the concentration product $np$ and/or the temperature is created there. By "hill" is meant there is a highly concentrated energy point from which particles may flow. In other words, an excess concentration of hole-electron pairs and of energy is produced at the spot where the energy is applied. These will normally flow radially outwardly from the regions of high concentration to regions of low concentration of energy and hole-electron pairs. The total particle flow, which is an ambipolar flow of electrons and holes, will be in accordance with the equation:

$$j_v = -\left(\frac{kT}{e}\right) \sigma^* \Delta \ln\ (npT\gamma)$$

In this formula $k$ is the Boltzmann constant, T is absolute temperature, $e$ is the electronic charge, $\sigma^*$ (sigma star) is the conductivity given by the product of the hole and the electron conductivities divided by their sum, the delta mark indicates gradient, ln is log to the base $e$, $n$ is the electron concentration, p is the hole concentration, T is the absolute temperature as stated and γ (gamma) is the dimensionless exponent of temperature of the "Soret" coefficient. Without a magnetic field applied but with heat or light energy applied, for example, flow of hole and electron pairs will occur in a direction outwardly (mainly a radial flow) from the region of high energy and high electron and hole concentrations toward regions of lower concentrations.

When a substantially uniform magnetic field is applied normal to the disc, it causes current flow of electrons in a first circular direction depending upon the direction in which the field is applied and causes hole flow in the opposite direction to the direction of electron flow. Since the electron flow causes positive electric flow in the opposite direction to the direction of electron flow and since that is the direction of flow of the holes, the hole flow and the electron flow are additive vectorially to provide total current flow. A solid in which there is an ohmic flow of current offers a resistance and experiences a force due to viscous drag of the solid on the flow of the current through it. This force in the disc produces a torque and hence, if the disc is mounted on a shaft with a bearing there would be rotation of the disc in the magnetic field. This current flow through the solid actually exerts a mechanical force on the solid. Circular motion is involved and the force is applied from a distance to provide a torque. In turn, this causes the solid to tend to rotate in a direction that is opposite the direction of the current (i.e., direction in which the electron current flow occurs). Thus, very simply, by creation of sufficient current flow for the mass of a particular solid, a motor may result because the disc may be considered as an armature into which a shaft may be placed or a shaft may be fastened and which shaft can rotate to do work.

Although a uniform magnetic field is desirable, a nonuniform field will also permit operation provided the major component of the field is parallel to the intended axis of rotation.

It is also possible, by masking out portions on the disc 11, to create potential "valleys" rather than potential "hills," so that the direction of motion of the disc may be controlled at will.

In the description given above, the torque is developed essentially by the generation, by means of heat or light energy, of excess hole-electron pairs and the subsequent ambipolar diffusion of the pairs in a magnetic field. In the case of an extrinsic semiconductor, in the so-called exhaustion range of temperatures, raising of the temperature of the material will produce very few hole-electron pairs. However, the thermal energy of the carriers (majority carrier) is increased and it appears that some of this energy is converted to mechanical energy of rotation by the application of a magnetic field, that is, part of the translational motion of agitation of the free carriers is converted into rotational motion in a plane at right angles to the direction of the magnetic field. This energy of rotation is in part reflected in the magnetic susceptibility X of the material. In general, the susceptibility of a material is made up of two parts; a positive contribution resulting from the alignment of the elementary magnetic dipoles, and a negative contribution (diamagnetic contribution) which is the result of the thermal motion of agitation. This invention is concerned with the latter or negative contribution.

The diamagnetic component of the susceptibility X, the one which involves the translational motion of the carriers, is given by the expression $X$ diamagnetic $= -(\pi/4)U\mu^2 +$ surface term, where U equals the thermal energy of the carriers and $\mu$ is the mobility.

In general, the "surface term" of the diamagnetic component is nearly equal to the first or bulk term $-(\pi/4)U\mu^2$, consequently the diamagnetic part of the susceptibility is quite small. However, in a temperature gradient the surface term has less effect and it appears that the torque developed may be represented by the following expression:

Torque per unit volume $= -\frac{1}{2}(\partial X_o/\partial T)B^2 \Delta T$
$= -\pi/8 B^2 \Delta T \partial/\partial T\ U\mu^2$ where B is the magnetic induction and $\Delta T$ is the temperature difference. Hence, a temperature gradient will produce a torque even in an extrinsic semiconductor. Optical radiation will produce a torque in either an intrinsic or extrinsic semiconductor. In general, the best material for utilization in applicant's invention is one in which $\sigma_p = \sigma_n$, that is one in which the conductivity of holes and electrons is equal. Examples of semiconductor materials which may be satisfactorily utilized include bismuth, P-type germanium, indium antiminide and gallium arsenide.

Figure 3:
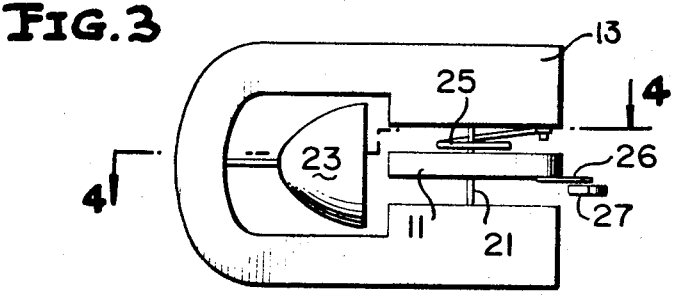
FIG. 3 is a side view of applicant's invention embodied in a light-sensitive meter.
Figure 4:
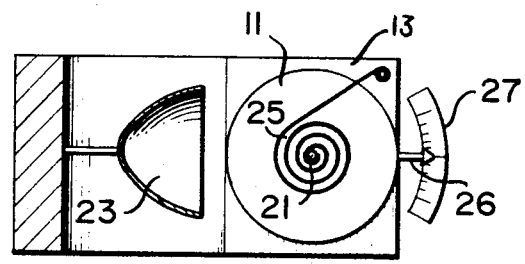
FIG. 4 is a top view of the device of FIG. 3, taken at line 44.

As shown in FIGS. 3 and 4, the disc 11 is suspended on bearings 21 on the magnet 13 with a reflector 23 positioned so as to concentrate light energy on the disc 11. Biasing means 25 interconnect the disc 11 and the magnet 13. Indicating means such as a pointer 26 is affixed to said disc 11 and cooperates with a scale 27. Upon impingement of light upon the disc 11, said disc rotates in opposition to biasing means 25 and indicates on scale 27 a value representative of the light energy impinging on said disc. Upon removal of said light energy, said disc 11 rotates to a home position under the influence of biasing means 25.

The current flow in the disc may be measured by the formula wherein the angular component of the current density $J_\theta =$ radial component of the current density $J_r$ times the tangent of the angle $\theta$ where $\theta$ is the angle between the direction of total current density of current flow and the radial electric field. The tangent of theta is equal to the mobility $\mu$ times the magnetic field B times $10^{-8}$ where $\mu$ is in centimeters squared per volt second, and B is in gauss. Then for copper, for example, $\mu B$ times $10^{-8}$ would be negligible since $\mu B$ times $10^{-8}$ for copper would be in the order of about .01 to .001. However, in the case of a semiconductor of indium antiminide where kept cool, $\mu$ is in the order of fifty thousand (50,000) and in a field of $4 \times 10^3$, which is theoretically possible, $\mu B \times 10^{-8} =$ tangent of theta $= 20 \times 10^7 \times 10^{-8} = 2$. This is large compared to copper and therefore the current flow in the angular direction is large. This can produce rotation of the disc. Thus the circulating current produces the torque necessary for rotation of the disc and this angular current in turn is produced by the radial current in a magnetic field.

Although specific apparatus has been shown for the purpose of describing applicant's invention, it will be apparent to those skilled in the art that other variations in the specific structure illustrated and the component materials mentioned may be made without departing from the spirit and scope of the invention.

I claim:
1. A semiconductor motor comprising
   means for establishing a uniform magnetic field,
   a semiconductor disc,
   means for movably mounting said disc normal to and within said field, and
   means for applying heat or light energy to a portion of said disc,
   whereby as the heat or light impinges on the disc it creates an area of concentrated energy causing an electrical current flow in the disc transverse to the magnetic field thereby producing a net force urging the disc to move.
2. A light-sensitive semiconductor meter comprising
   means for establishing a uniform magnetic field,
   a semiconductor disc,
   means for rotatively mounting said disc normal to and within said field,
   biasing means connected to said disc for opposing rotation of said disc when light energy is applied and for returning said disc to home position when no light energy is applied, reflective means for concentrating light energy on the periphery of said disc, whereby as the light impinges on the disc it creates an area of concentrated energy causing an electrical current flow in the disc transverse to the magnetic field thereby producing a net torque urging the disc to rotate, and, indicating means connected to said disc and so calibrated to represent the sum of light energy applied to said disc.

References Cited

UNITED STATES PATENTS

| | | | |
|---|---|---|---|
| 2,968,227 | 1/1961 | Melle | 88—23X |
| 3,238,396 | 3/1966 | Schubring et al. | 310—4 |
| 3,304,445 | 2/1967 | Weddel et al. | 310—4 |

JEWELL H. PEDERSEN, *Primary Examiner.*

W. A. SKLAR, *Assistant Examiner.*

U.S. Cl. X.R.

310—4, 178; 324—106; 307—309, 310, 311; 356—216